United States Patent [19]

Lederle

[11] Patent Number: 4,533,901
[45] Date of Patent: Aug. 6, 1985

[54] ANTICATCHING DEVICE FOR AUTOMATIC DOORS OR WINDOWS

[75] Inventor: Franz Lederle, Weichs, Fed. Rep. of Germany

[73] Assignee: Gebr. Bode & Co., Kassel, Fed. Rep. of Germany

[21] Appl. No.: 361,166

[22] Filed: Mar. 23, 1982

[30] Foreign Application Priority Data

Mar. 25, 1981 [DE] Fed. Rep. of Germany ....... 3111711

[51] Int. Cl.³ .............................................. H02P 1/04
[52] U.S. Cl. ..................................... 340/52 R; 49/28
[58] Field of Search ............... 340/52 R, 19 A, 19 R, 340/20, 21, 825.2; 49/26, 27, 28, 31, 118; 364/184

[56] References Cited

U.S. PATENT DOCUMENTS 3,048,818  8/1962  Burckhardt et al. ................. 340/21
4,338,553  7/1982  Scott, Jr. ................................ 49/31
4,376,971  3/1983  Landgraf et al. .................... 364/184

Primary Examiner—John W. Caldwell, Sr.
Assistant Examiner—E. G. Harding
Attorney, Agent, or Firm—Sprung Horn Kramer & Woods

[57] ABSTRACT

An anticatching device for automatic doors or windows, especially of vehicles. The motion of the door or window is divided into several segments and the time required to pass through a segment is compared with a given time interval. These given time intervals are obtained by storing the time intervals measured during each preceding motion of the door between the same positions. Once the time intervals have been compared, a control signal that stops or reverses the motion of the door is released only when the measured value is greater by a predetermined tolerance than the stored value. To determine the position and direction of motion of the door, the successive position signals are assigned values that are compared and this comparison produces a signal that indicates whether the door is opening or closing.

10 Claims, 2 Drawing Figures

ANTICATCHING DEVICE FOR AUTOMATIC DOORS OR WINDOWS

BACKGROUND OF THE INVENTION

The present invention relates to an anticatching device for automatic doors or windows, especially those of vehicles.

The doors of buses, trolleys, subways, and similar means of transportation are usually opened and closed from the driver's seat by means of a signal. To avoid accidents, safety devices are provided to prevent the passengers or their clothing or other belongings from getting caught in the closing door and to keep the door itself from getting stuck in the half-opened position.

Various types of safety devices, like light barriers parallel to the plane of closure of the door or like limit switches in the rubber that covers its edge, are known. Because such devices do not provide enough safety and because they are subject to breakdown, it has already been proposed in U.S. Pat. No. 4,376,971 to couple with the door or door mechanism, an electric signal generator that emits an electrical signal every time the door reaches a predetermined position, the signals being fed into memory elements wherein they are compared with given intervals. When anything gets caught in the door and delays its motion so that the interval between two position signals increases beyond a predetermined limit, the generator will emit a control signal to stop or reverse the motion of the door. The intervals between the detected position signals are compared with the given intervals by memory elements.

This previously proposed safety device is reliable and can be easily adapted to the opening or closing speed of a door because the predetermined intervals stored in the memory unit can be regulated. The device, however, also has drawbacks in that the memory elements must be readjusted individually for each individual door, which consumes a lot of labor during installation, and in that the speeds at which doors open and close not only differ from door to door but also depend on ambient conditions, especially temperature. If the doors are adjusted at normal room temperature, they may open at low winter temperatures so slowly that the predetermined interval is exceeded, releasing a control signal that will stop or reverse their motion.

SUMMARY OF THE INVENTION

The present invention is intended as an anti-catching device that will be reliable and independent of outside conditions, especially variations in temperature. The starting point of the invention is a device as in the application described above, in which an electric signal generator is coupled with the door or door mechanism and emits an electrical signal every time the door reaches a predetermined position, the interval between two consecutive signals being measured and compared with given intervals while a control signal stops or reverses the motion of the door when the two intervals do not coincide.

The predetermined interval that is compared with the measured interval is, in accordance with the invention, the interval that is measured at every previous corresponding motion of the door between the same positions. This allows the device to adjust automatically to changing ambient conditions. If, that is, the doors close rapidly in warm summer weather, correspondingly shorter intervals between the positions will be measured and stored, and the anticatching device will be activated when these relatively brief intervals are exceeded as the result of interference, for instance by an object getting caught in the doors. If, on the other hand, the doors close more slowly when the temperatures are lower, correspondingly longer intervals will be stored and the device will be activated when these longer intervals are exceeded. It will also no longer be necessary to readjust the device every time it is installed with a different door because it will, in accordance with the invention, automatically adjust itself to the motion of each individual door.

If, however, a control signal were emitted whenever the measured time was only very slightly longer than the interval stored during the previous motion of the door, for example when the temperature was dropping, and if the device were to respond, it would be too sensitive. To prevent oversensitivity, the control signal is not emitted unless the measured interval between two position signals is longer by a predetermined tolerance than the stored interval corresponding to the previous motion of the door. This predetermined tolerance can be obtained by increasing each measured time interval by a specific value and storing the increased value as the given interval.

The time that a door takes to move from one position to another varies according to whether the door is opening or closing, because in most known designs the door does not move at a uniform speed but accelerates, moving through the first leg of its path much more slowly than through the final leg. The time the door takes to open and the time it takes to close must therefore be stored in the memory for each leg, and the controls must be able to differentiate between position signals emitted by an opening door or by a closing door. To allow such differentiation, the position signals can be assigned values and, also in accordance with the invention, the values of subsequent signals compared and a signal derived from them that specifies whether the door is opening or closing. Either digital or analog values can be assigned to the position signals. It is particularly practical to provide the signal generator with a corresponding number of positions that are powers of two and that can be represented with binary numerals. It has proved especially practical to provide the signal generator with eight positions so that the values can be represented by three digit binary numbers. If the values are established so that when the door is opening the first position signal is assigned the lowest value and the last position signal the highest value, and vice versa, so that the first position signal is assigned the highest value and the last position signal the lowest when the door is closing, the immediate result will be that, when the values are being compared if a subsequent signal has a higher value than its preceding signal, the door is opening and, vice versa, if a subsequent signal has a lower value than its preceding signal, the door is closing.

This assignment of values to the position signals, however, also makes it possible to compare the intervals measured during the motion of the door with the correct intervals in the memory, even when a disruption prevents the door from opening or closing completely, before it begins to move again.

Any known type of switch can be employed for the signal generator. It is practical to employ non-contact switching elements like, for example, switching devices that can be controlled with permanent magnets and that are known as reed switches or, even better, Hall-effect switches, which can be controlled by a magnet connected to the door. The advantage of a Hall-effect switch is that it is extremely reliable and insensitive to contamination and corrosion, which ensures a long life.

Since the measured times between position signals are always compared with the interval that was measured during the preceding door motion, all previously stored intervals must be erased. To ensure continued unobjectionable operation of the device after a disruption, after, that is, too long an interval has been detected between two position signals, it is also possible for the stored signals not to be erased until the measured interval coincides with the stored interval within the prescribed tolerance, at which time the new interval will be stored, whereas, if they do not coincide, the preceding interval, which will thus represent a normal door motion, will remain stored.

When the door is a double door, each wing should have an independent anticatching device because it is possible for only one wing to be prevented from moving by an obstruction. To immediately release objects or persons caught in the door however, both circuits can be connected in such a way that the stop or reverse signal will affect both wings in the same sense.

Some embodiments of an anticatching device in accordance with the invention will now be specified with reference to the drawings, wherein:

DETAILED DESCRIPTION OF THE INVENTION

Figure 1:
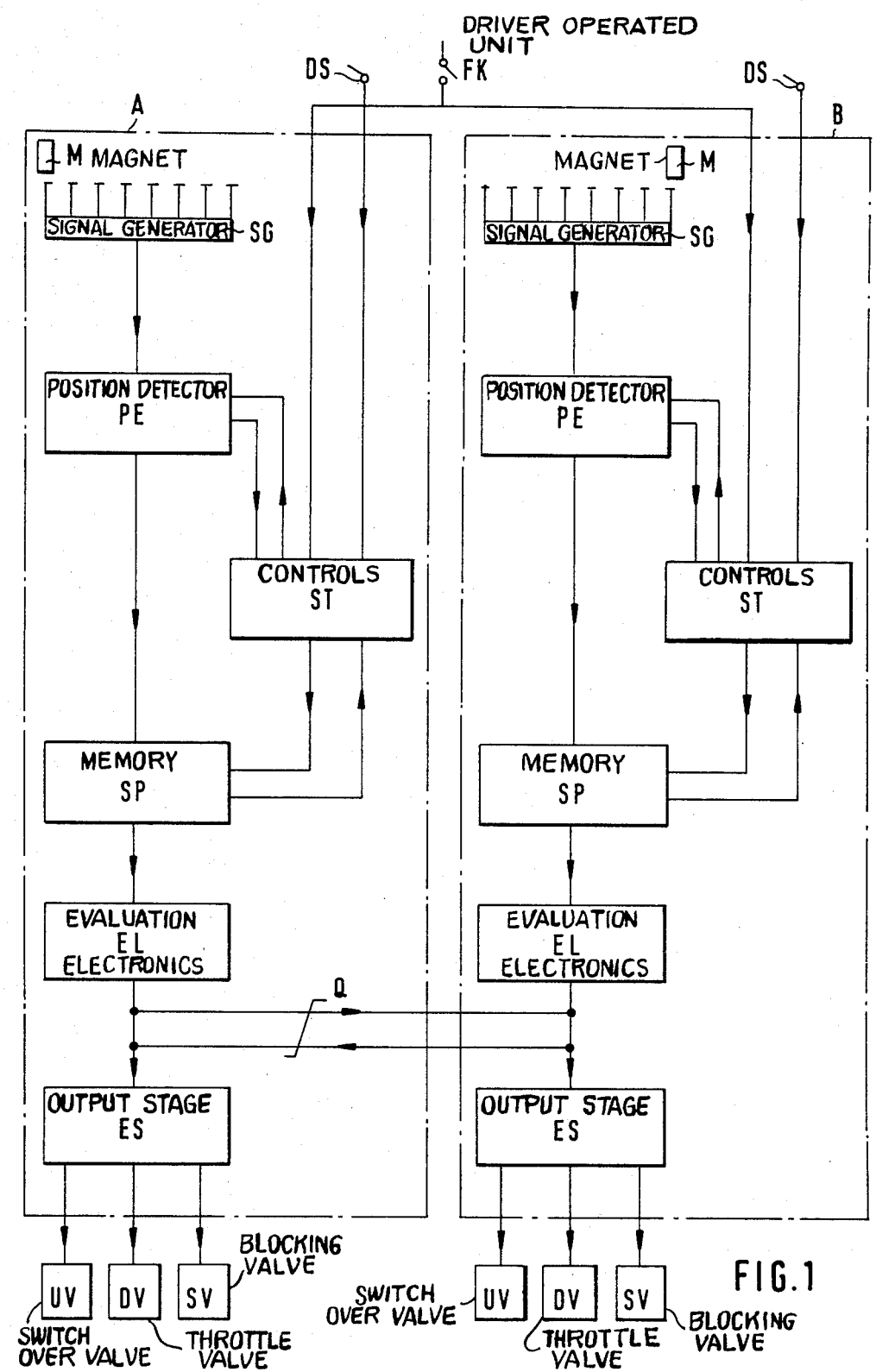
FIG. 1 is a block diagram of the device according to the invention as used with a double door.

The double doors with which the device in FIG. 1 is employed have wings A and B. A signal generator SG is assigned to each wing. The contact of each signal generator is activated by a magnet M. The path covered by the door as it opens and closes is broken down into seven segments and the signal generator accordingly has eight contacts. Position signals emitted by signal generator SG travel to a position detector PE, which detects each position of the door including the open and closed position. From position detector PE the positions signals travel to memory SP and to controls ST. The controls obtain the signal to open or close the doors from a driver-operated unit FK, and one signal usually controls both wings as well as, when the vehicle has several doors, all the doors in the vehicle. From memory SP the signals travel to the evaluation electronics EL in which the measured intervals are compared. When comparison indicates that the door motion is obstructed, evaluation electronics EL transmit a control signal to output stage ES, which is short-circuit proof. If this control signal occurs while the door is closing, which is the case when the door is obstructed, it activates switchover valve UV, which immediately causes the door to open. If the signal occurs while the door is opening, it indicates that someone or something is caught on the rear edge of the door. Since the door should not be closed in such cases, a blocking valve SV is activated and empties the door cylinder of air so that the door will remain still but will still be easy to move manually. If driver-operated unit FK is operated at this time, the magnet in throttle valve DV will receive a pulse, the door will open slowly because the pressure has not yet built up again in the empty cylinder, and unit FK will remain unactivated until the normal pressure builds up in throttle valve DV again. This prevents the door from slamming shut.

When someone or something gets caught in the double door, one wing often meets resistance first, followed somewhat later by the other wing. In such cases it is practical for both wings to open again or at least remain still as soon as one wing meets resistance. This is ensured by the two connections Q that transmit a control signal from the electronics for wing A to the final stage of wing B and, vice versa, from the electronics for wing B to the final stage of wing A.

Figure 2:
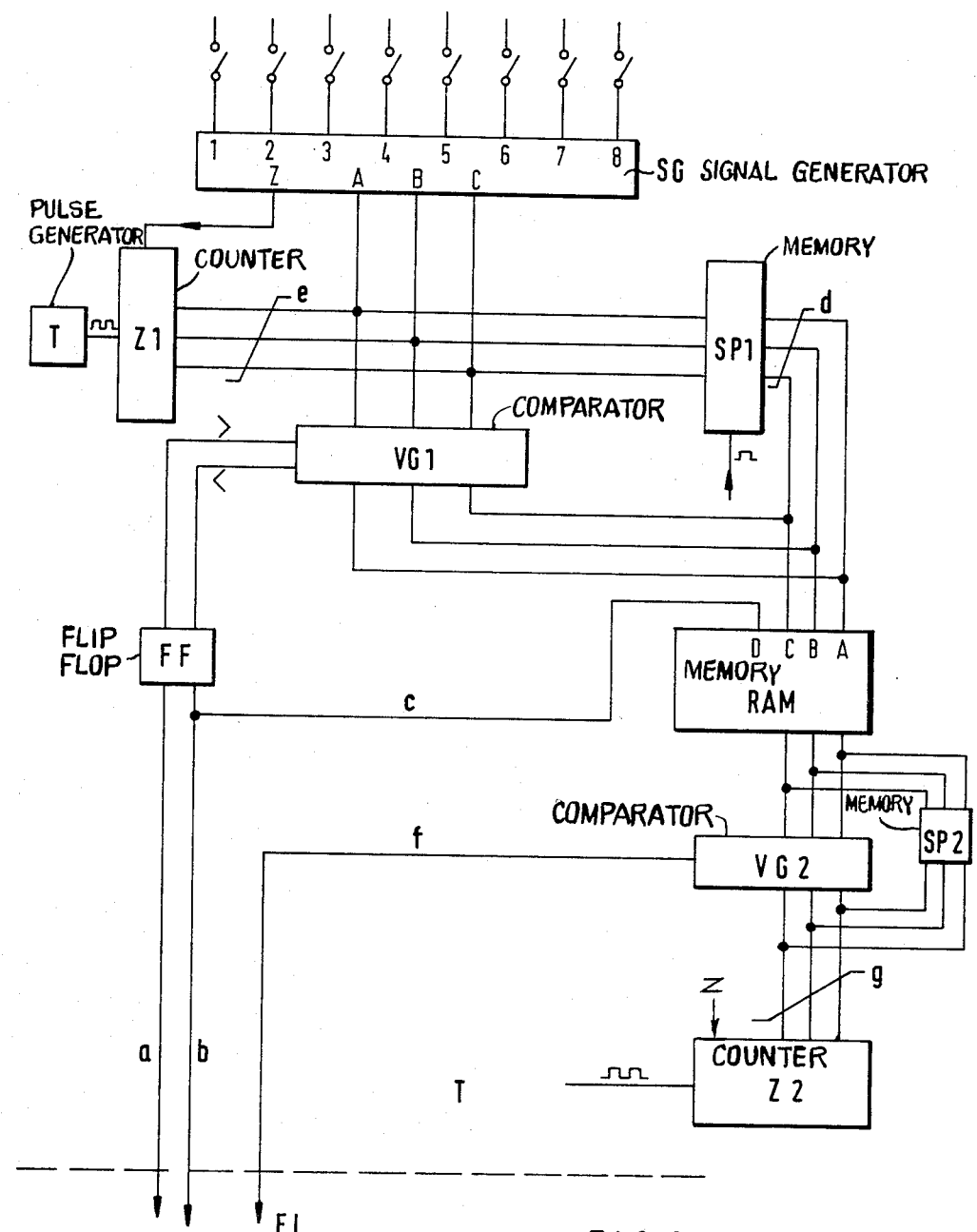
FIG. 2 is a block diagram of the measuring component of the device of FIG. 1.

FIG. 2 represents the circuit PE that detects the position of the door and the direction in which it is moving and stores the values in the memory SP. SG is again the signal generator with its eight position switches. The numbers of the switches are converted into three-digit binary numbers under the assumption that the binary number 000 is assigned to switch 1 and the binary number 111 to switch 8, with the binary values increasing from switch 1 to switch 8. Position signals from the switches are transmitted through lines A, B and C to comparator VG1 and to memory SP1. Counter Z1 has a 1 KHz pulse generator T connected thereto along with a start-stop signal from output Z to counter Z1. Each time the position is changed counter Z1 counts and the values measured by counter Z1 are stored in memory SP1 via lines e and the value of an incoming signal is compared with the value, as supplied by the memory SP1, of the preceding signal in comparator VG1. If the value of the incoming signal is higher than that of the preceding signal, it means that the door is moving from switch 1 toward switch 8 and, if the door closes from left to right, that it is closing. If on the other hand the value of the incoming signal is lower than the value of the previously stored signal, this means that the door is moving from switch 8 to switch 1 and is opening. An appropriate signal will now travel from comparator VG1 to flip-flop FF, whence the signals to open or close the door travel over lines a and b to evaluation electronics EL, not shown. The signal also travels from flip-flop FF over line c to the random-access read-and-write memory RAM. The binary value in memory SP1 is sent as an address over line d to memory RAM. This address is added to by the signal coming over c, indicating whether the door is opening or closing, the yielding a four-digit binary address that makes it possible to determine the stored value obtained from the previous motion that corresponds to the segment of the path currently being traveled by the door.

When the door leaves the first contact in a segment, counter Z2 is activated by the start-stop signal from line Z and receives pulses from pulse generator T. When the subsequent switch is reached, counter Z2 stops and the transit time is measured. The result is transmitted as a binary value over the three lines g to buffer memory SP2 wherein it is stored and to comparator VG2, which simultaneously receives the previously stored value for the same path segment from memory RAM and conducts the comparison. If comparison indicates agreement within the prescribed tolerance, the newly measured value is increased by the amount of tolerance, by two generator pulses for example, and the increased value is stored in memory RAM, with the previously stored value being erased. If, however, the measured value is higher than the stored value by more than the prescribed tolerance, a control signal is transmitted over line f to evaluation electronics EL, when then, according to which signal, that governing opening or that governing closing, is encountered over lines a, b, activate either switchover valve UV (in FIG. 1), which reverses the motion of the door, or blocking valve SV, which keeps the door motionless until throttle valve DV is activated, after which the door opens slowly. In this case the measured value will not be stored and the previously stored value signifying unblocked door motion will be retained in the memory. As is obvious, when door motion is reversed, the change in direction will also be communicated through flip-flop FF to the evaluation electronics and memory RAM, so that the position signals and measured intervals released as the door continues to move will be compared with the correct memory values.

This process will ensure dynamic time measurement, with the entire system calibrating itself. In other words, door-motion intervals that correspond to the state of the door and to the ambient conditions at any particular time will always be provided, eliminating the necessity of measuring individual ambient conditions and providing them to the electronics.

It will be anticipated that the instant specification and claims are set forth by way of illustration and not limitation, and that various modifications and changes may be made without departing from the spirit and scope of the present invention.

What is claimed is:

1. In an anticatching control device for automatic doors or windows of vehicles and the like, having an electric signal generator coupled with a movable member of a door or window mechanism to produce an electrical position signal every time the member reaches a predetermined position and circuit means receptive of the position signals for measuring the time interval between two consecutive signals and comparing same with given time intervals to produce a control signal when there is an unfavorable comparison to effect the stopping or reversing of the motion of the member, the improvement wherein the signal generator produces at least two position signals during the movement of the members between predetermined positions corresponding to selected segments thereof in the closing direction and in the opening direction and wherein the circuit means comprises means for storing previous measured time intervals for each segment for the closing direction and for the opening direction and means for comparing a current measured time interval to a previous measured time interval for that same segment and for the same direction to produce said control signal.

2. The device according to claim 1, wherein the comparing means produces the control signal when the measured time interval for a segment is longer by a predetermined tolerance than the stored time interval for that segment.

3. The device according to claim 2, wherein the measuring means includes means for increasing each measured time interval by a specific value corresponding to said tolerance and effecting the storing of the increased value as the measured time interval.

4. The device according to claim 1 or claim 3, wherein the signal generator has means for assigning values to the position signals and wherein the circuit means further comprises means for comparing the current position signal to a subsequent one to determine whether the member is moving in the opening or closing direction.

5. The device according to claim 4, comprising seven segments defined by eight positions and wherein the signal generator produces a three-digit binary number to represent the position of the member at each segment.

6. The device according to claim 1 wherein the electric signal generator comprises Hall-effect switches and a magnet connected to the member.

7. The device according to claim 1, wherein the means for storing comprises means for replacing the stored time interval with current measured time interval when the current measured time interval coincides with the stored time interval within the prescribed tolerance.

8. The device according to claim 4, further comprising means receptive of the control signal to reverse the motion of the member when in the closing direction and stopping the member when in the opening direction.

9. The device according to claim 8, wherein the means receptive of the control signal effects the emptying of a driving cylinder for a pneumatic door mechanism when the door is opening.

10. The device according to claim 1, wherein the door mechanism is a double door and wherein each wing has an independent anticatching device which are interconnected to stop or reverse both wings in the same sense and at the same time.

* * * * *